(12) United States Patent
Renner, III et al.

(10) Patent No.: US 11,962,501 B2
(45) Date of Patent: Apr. 16, 2024

(54) EXTENSIBLE CONTROL PLANE FOR NETWORK MANAGEMENT IN A VIRTUAL INFRASTRUCTURE ENVIRONMENT

(71) Applicant: Sunder Networks Corporation, Raleigh, NC (US)

(72) Inventors: Richard Grover Renner, III, Boston, MA (US); Richard Witzke, Colorado Springs, CO (US); Mark Cannon, Raleigh, NC (US)

(73) Assignee: Sunder Networks Corporation, Raleigh, NC (US)

( * ) Notice: Subject to any disclaimer, the term of this patent is extended or adjusted under 35 U.S.C. 154(b) by 0 days.

(21) Appl. No.: 17/185,347

(22) Filed: Feb. 25, 2021

(65) Prior Publication Data
US 2021/0266259 A1 Aug. 26, 2021

Related U.S. Application Data

(60) Provisional application No. 62/981,250, filed on Feb. 25, 2020.

(51) Int. Cl.
*H04L 45/745* (2022.01)
*H04L 45/586* (2022.01)

(52) U.S. Cl.
CPC .......... *H04L 45/745* (2013.01); *H04L 45/586* (2013.01)

(58) Field of Classification Search
CPC . H04L 45/745; H04L 45/7453; H04L 45/586; H04L 49/354; H04L 49/70
See application file for complete search history.

(56) References Cited

U.S. PATENT DOCUMENTS

| | | | |
|---|---|---|---|
| 9,331,940 B2 | 5/2016 | Balus et al. | |
| 9,565,105 B2* | 2/2017 | Kapadia | H04L 45/745 |
| 9,614,763 B2 | 4/2017 | Dong et al. | |
| 9,641,394 B2* | 5/2017 | Jubran | H04L 41/12 |
| 9,647,849 B2 | 5/2017 | Kapadia et al. | |
| 9,800,491 B1 | 10/2017 | Zuk et al. | |
| 9,900,250 B2 | 2/2018 | Dong et al. | |
| 9,929,960 B1 | 3/2018 | Abts et al. | |
| 10,007,586 B2 | 6/2018 | Allen et al. | |
| 10,142,264 B2 | 11/2018 | Nataraja et al. | |
| 10,250,553 B2 | 4/2019 | Chanda et al. | |
| 2012/0287930 A1 | 11/2012 | Raman | |

(Continued)

*Primary Examiner* — Mohamed A Kamara
(74) *Attorney, Agent, or Firm* — Williams Mullen; Andrew R. Shores

(57) ABSTRACT

Systems and methods for network management in a virtual environment are presented. The system and methods may include or utilize a top of rack router and a plurality of nodes within a virtual network environment, and an extensible network control plane that is extendable from the top of rack router to the plurality of nodes. Upon receipt of a data packet at the top of rack router, information regarding the packet's desired endpoint address can be determined and a unique endpoint address within the environment covered by the control plane created such that the packet can be directly routed to the desired endpoint without the need for intermittent hops to non-endpoint pods, etc. Hardware solutions may be utilized to eliminate latencies in the process. Data packet flows may also be identified and used to further reduce latencies.

20 Claims, 7 Drawing Sheets

(56) References Cited

U.S. PATENT DOCUMENTS

| | | | |
|---|---|---|---|
| 2015/0281120 A1* | 10/2015 | Sindhu | H04L 47/805 709/226 |
| 2016/0285753 A1* | 9/2016 | Guleria | H04L 45/38 |
| 2016/0294728 A1 | 10/2016 | Jain et al. | |
| 2017/0171067 A1 | 6/2017 | Kapadia et al. | |
| 2018/0131610 A1 | 5/2018 | Dong et al. | |
| 2018/0176181 A1 | 6/2018 | Fu et al. | |
| 2018/0367449 A1* | 12/2018 | Pani | H04L 41/40 |
| 2019/0188079 A1* | 6/2019 | Kohli | G06F 11/1076 |
| 2019/0207904 A1 | 7/2019 | Chanda et al. | |
| 2019/0311127 A1 | 10/2019 | Raghuram et al. | |
| 2019/0386891 A1 | 12/2019 | Chitalia et al. | |
| 2019/0386973 A1 | 12/2019 | Patwardhan et al. | |

* cited by examiner

```
apiVersion: extensions/v1beta1
kind: Ingress
metadata:
  name: frontend
  namespace: networkc1
spec:
  rules:
  - host: ...
    http:
      paths:
      - backend:
          serviceName: frontend
          servicePort: 8001
        path: /
```

Fig.5

```
apiVersion: v1
kind: Service
metadata:
  name: frontend
  namespace: networkci
spec:
  clusterIP: 10.233.124.64
  ports:
  - name: public
    port: 8001
    protocol: TCP
    targetPort: 8001
  - name: internal
    port: 8002
    protocol: TCP
    targetPort: 8002
  selector:
    app: frontend
  sessionAffinity: None
  type: ClusterIP
```

Fig.6

```
apiVersion: v1
kind: Endpoints
metadata:
  name: frontend
  namespace: networkc1
subsets:
- addresses:
  - ip: 10.233.16.222
    nodeName: node02
    targetRef:
      kind: Pod
      name: frontend-9cf4d9cd8-gbcfd
      namespace: networkc1
  ports:
  - name: internal
    port: 8002
    protocol: TCP
  - name: public
    port: 8001
    protocol: TCP
```

Fig.7

EXTENSIBLE CONTROL PLANE FOR NETWORK MANAGEMENT IN A VIRTUAL INFRASTRUCTURE ENVIRONMENT

PRIORITY

The present application claims priority to U.S. Provisional Patent Application No. 62/981,250, filed Feb. 25, 2020, the disclosure of which is incorporated by reference herein in its entirety.

FIELD

The present disclosure relates to the processing, storage and retrieval of computer data. In different aspects, the present disclosure describes a novel network fabric allowing time-efficient transmission of data.

BACKGROUND

Virtual infrastructure environments (VIE) or virtual network environments are increasingly used by enterprises for collaboration and for storing data and/or resources. A typical VIE contains numerous infrastructure elements, including networking elements, compute elements, and storage elements. Such elements can include but are not limited to servers, switches, pods, and may be centrally located or located remotely in, for example, "the cloud." The network management system provides both inter-environment and intra-environment connections, as well as managing access and security for the VIE. Improving operational efficiency, optimizing utilization of resources, and reducing interconnection latency in VIEs are important challenges facing VIE managers. VIE managers want a resilient VIE network controller that supports and protects a diverse range of applications and services from disruptions.

One exemplary issue facing VIE managers today involves inefficiencies in the way network traffic is forwarded to and routed within certain environments. For example, current virtual environments require packets coming into a VIE to go through several steps to determine proper routing to the desired endpoint (e.g., kernel, various table lookups, etc.). If these several steps were reduced or eliminated, it would be possible to more quickly route an external packet to its desired endpoint (and vice versa), thereby reducing latency in the system.

SUMMARY

The present disclosure provides a solution to the above issues that removes the existing network ingress and forwarding services from the intra-cluster infrastructure controller, and instead uses a network fabric with endpoints coinciding with individual nodes and pods within the cluster. In one exemplary embodiment, a Top of Rack ("ToR") hardware router is employed that advantageously utilizes faster hardware processing than current software solutions that disadvantageously compute scheduling and process table calls using slower and more resource intensive software applications. Those software inefficiencies are compounded where processes stacking in the kernel cause resource utilization to increase. The reduced cost of programmable ASIC and/or FPGA chips today facilitates the ability to provide a hardware solution as disclosed herein. Embodiments of the present solution can employ other hardware such as NPU, CPU, Software on CPU/x86 processors, and the like.

Embodiments of the present disclosure may further utilize a network fabric or extensible network fabric that extends from the ToR directly into the cluster. The fabric can extend, for example, into the various Container Network Interfaces (CNI) via programmable Network Interface Controllers (NICs), in some embodiments. In extending the fabric, a processor for controlling the ingress/egress of each node (e.g., ingress controller) in the system can be eliminated and instead be consolidated in the ToR, advantageously utilizing the hardware solutions discussed elsewhere herein. In particular, by integrating the ingress controller (for example) in the ToR in a hardware solution (e.g., ASIC, FPGA, ASIP, etc.), relatively high-latency software solutions on a CPU can be eliminated. Intermediary nodes can also be eliminated, further reducing latency. By extending the network fabric directly into the cluster, the address pool requirements may also be simplified. The ingress controller (for example) can watch for changes to the packet specifications (e.g., host(s) and/or path(s)) and write definitions and subsequent matches to the ingress table in the ToR hardware, including for example identifying particular flows of data or data packets and routing the flows accordingly.

In some embodiments, a system for managing communications in a virtual infrastructure environment is presented. The system may include a top of rack router comprising a processor, and the top of rack router may be configured to receive a first data packet from outside the virtual infrastructure environment. The system may also include a plurality of nodes within the virtual infrastructure environment, wherein each of the nodes includes a network interface controller and a socket. The system may also include an extensible network control plane extendable from the top of rack router to the plurality of nodes.

Upon receipt of the first packet, the system may be configured to use the top of rack router to write an index location that includes an endpoint address readable by the extensible network control plane within the plurality of nodes on a forwarding table and the first data packet, and the first data packet may be routed directly to the endpoint address.

In some embodiments, the top of rack router may identify one or more subsequent data packets having one or more flow specific characteristics associated with the first data packet, and write the index location to the one or more subsequent packets without utilizing the forwarding table. The system may then forward the one or more subsequent packets to the endpoint address. The flow characteristics may include a hash value common to headers of the data packets of the flow. In some embodiments, a hash value of a header of the first data packet may be logged in a register, and the registered hash values may be used to identify the one or more subsequent data packets of the flow.

In some embodiments, the first data packet may be returned to a location outside the virtual infrastructure environment via the top of rack router. The top of rack router may use the forwarding table to identify the first data packet and replace the index location information with original source information, and the first data packet may be forwarded out of the virtual network environment.

In some embodiments, the one or more subsequent data packets may be returned to a location outside the virtual infrastructure environment. The top of rack router may identify the one or more subsequent data packets having one or more flow specific characteristics associated with the first data packet, and apply the original source/destination information of the first data packet to the one or more subsequent packets without utilizing the forwarding table.

In some embodiments, the step of writing the index location to the forwarding table may be performed using a hardware processor. The hardware processor may include an application-specific integrated circuit (ASIC), field-programmable gate array (FPGA), or an application-specific instruction set processor (ASIP).

Further, various communication protocols may be employed, including among others HTTP.

DESCRIPTION OF DRAWINGS

FIGS. 5 through 7 are exemplary diagrams of code and processes illustrating how an ingress controller according to the present disclosure (i.e., a "Sunder controller") can monitor and update cluster routing as compared to a conventional controller.

DETAILED DESCRIPTION

Figure 1:
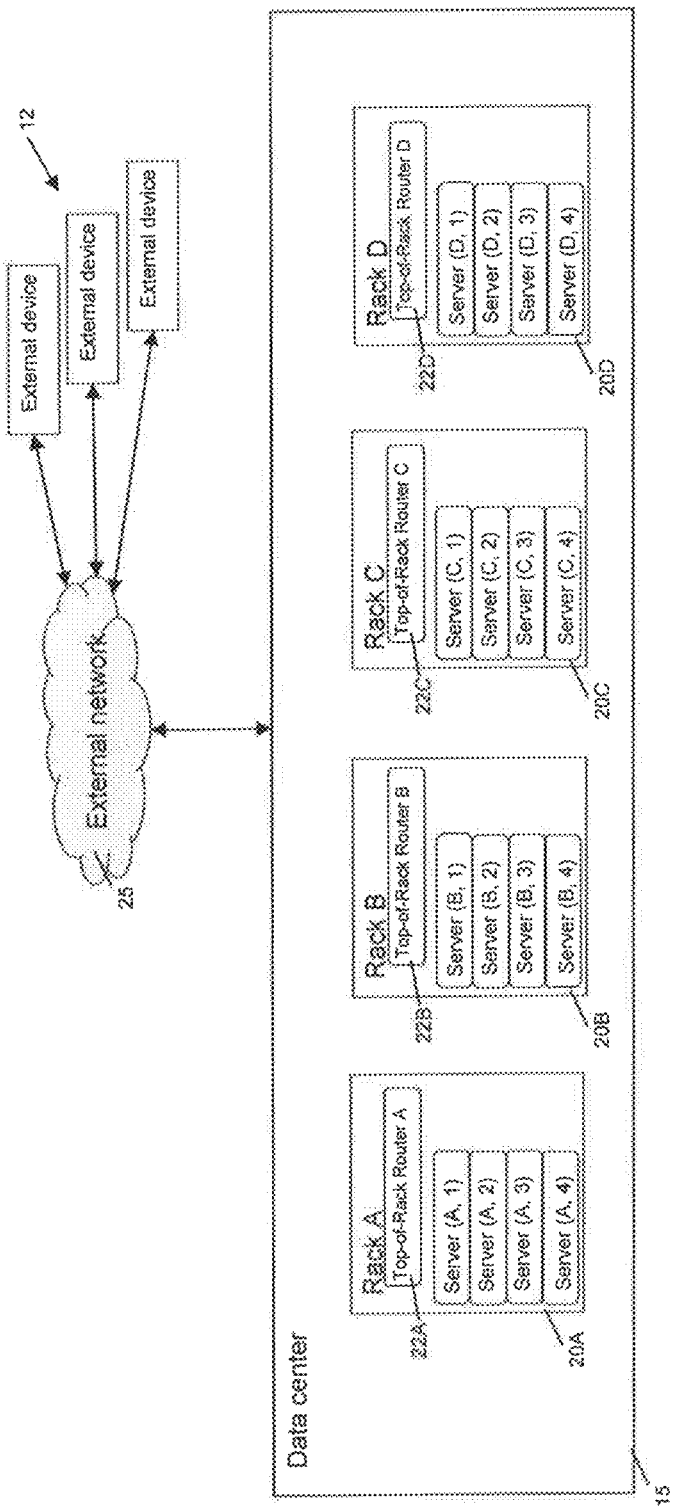
FIG. 1 is a schematic diagram of an exemplary data center illustrating an environment for embodiments of the present disclosure.

FIG. 1 is a schematic diagram of an exemplary data center 15. The data center 15 may include multiple racks, for example racks A, B, C, D. Each rack may include a respective plurality of servers 20A, 20B, 20C and 20D. In the exemplary embodiment in FIG. 1, individual servers are shown by rack number and server number (e.g., server A, 1 is the top server of server group 20A in Rack A). Each rack A, B, C and D may also house at least one top of rack ("ToR") router (see 22A, 22B, 22C and 22D). Although illustrated as a single group of servers per rack, in practice, a rack may house multiple groups of servers and a ToR router for each group.

Each server can be connected to an external data network 25 via links between ToR routers and potentially devices such as aggregation layer devices and/or a gateway device (not shown).

Figure 2:
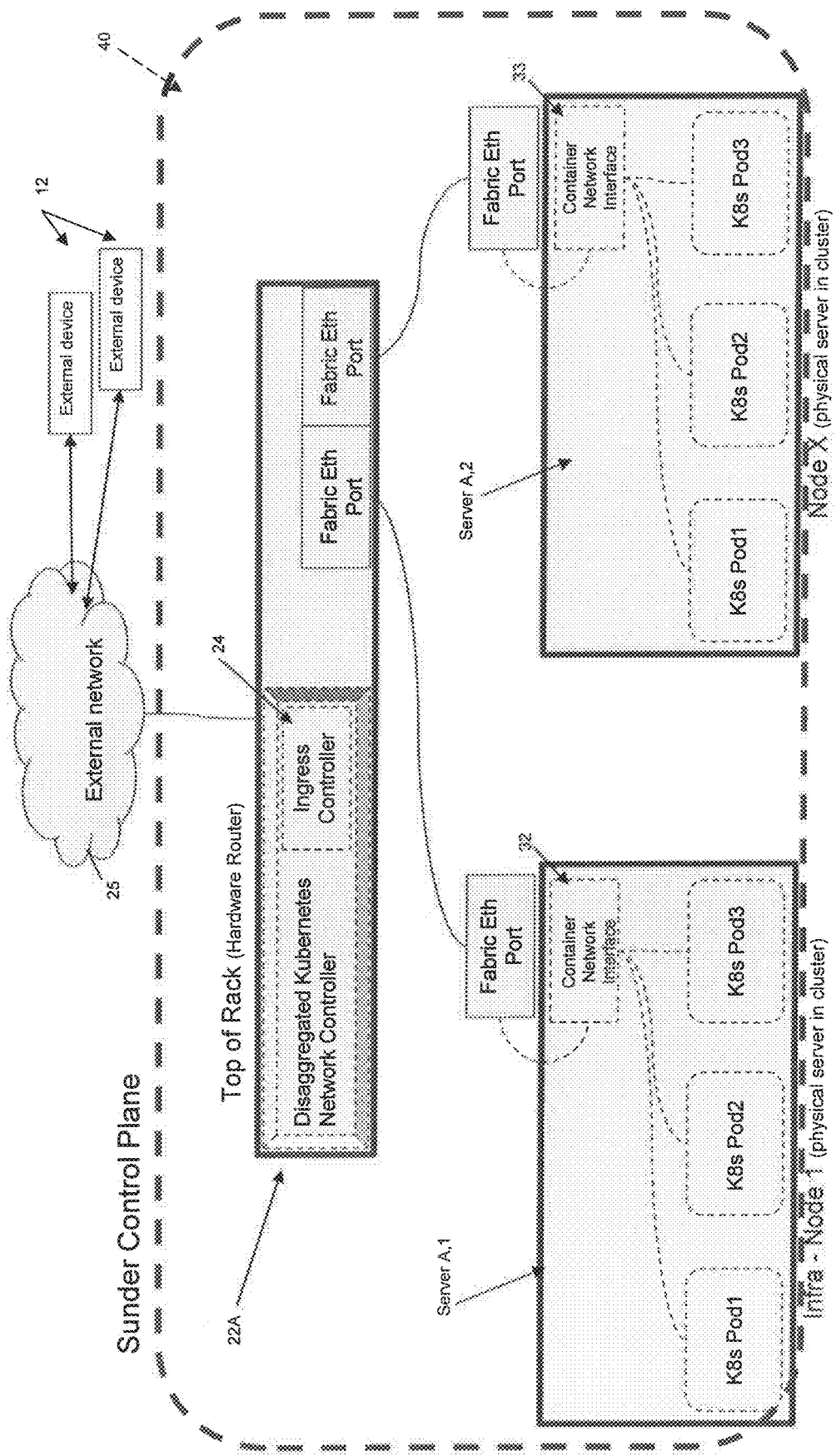
FIG. 2 is a schematic diagram of an exemplary control plane according to embodiments of the present disclosure.
Figure 3:
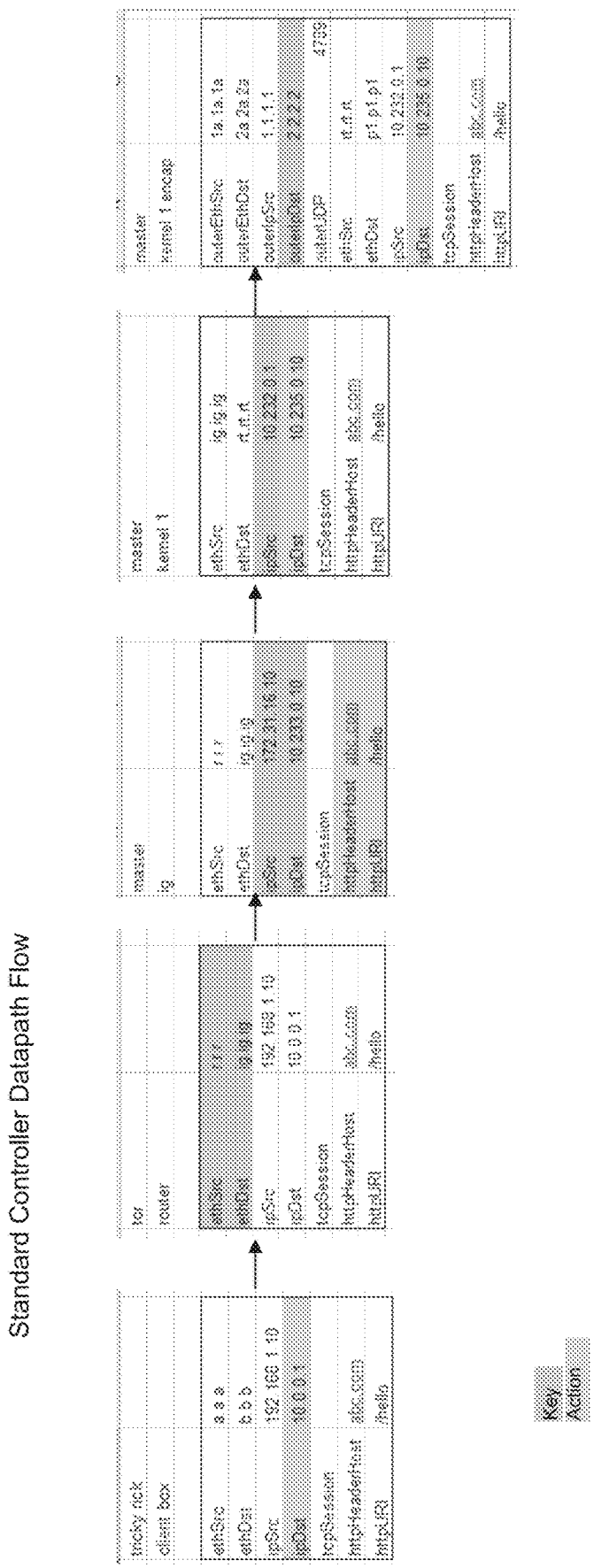
FIG. 3 is a flow diagram illustrating a standard controller data path flow.
Figure 4:
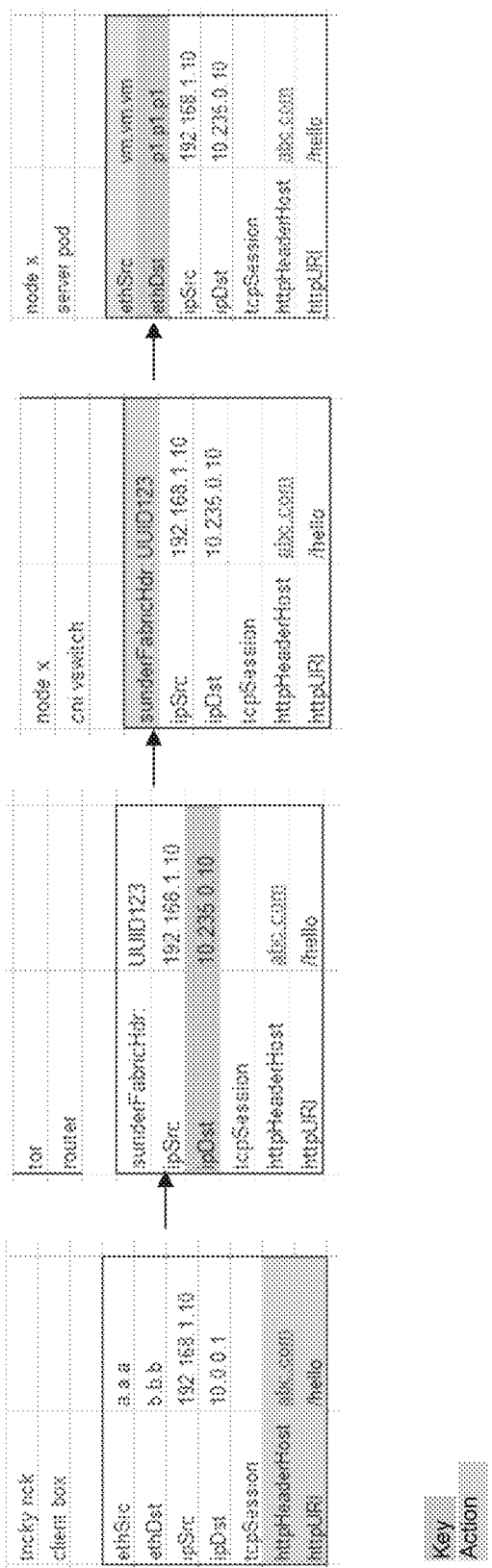
FIG. 4 is a flow diagram illustrating a dis-aggregated container management network controller according to embodiments of the present disclosure.

The data center 15 can be understood to be a facility that provides utilities such as shelter, electricity and cooling to a number of host servers. Typical data centers are buildings provided with electricity and ventilation or air conditioning, but may include other services as well. The host servers housed in the data center 15 can be accessed externally via an external data network 25, for example. It will be appreciated that the external data network 25 can include multiple connected sub-networks. In various embodiments, the external data network 25 can be provided as a local-area network (LAN), such as a company intranet, a metropolitan area network (MAN), a wide area network (WAN), an inter-network such as the Internet, or a peer-to-peer network, e.g., an ad hoc WiFi peer-to-peer network. The external data network 25 can be any type and/or form of data network and/or communication network. The external data network 25 can be public, private, or a combination of public and private networks. As illustrated in FIGS. 1 through 3, the external data network 25 can be used to convey information between external computing devices 12 and the host servers 20A, 20B, etc., within the data center 15.

In various embodiments, and as shown in the exemplary embodiment in FIG. 2, the ToR router can include an ingress controller 24 and can be configured to receive packet data from outside a virtual infrastructure environment (e.g., from the external network 15). Each server (e.g., A,1-D,4) can be considered a node within the virtual infrastructure environment, wherein each of the nodes can include, for example, a network interface controller (NIC) and one or more sockets, for example, a container network interface (CNI). In some embodiments, the socket may be considered a port for a particular process (i.e., an interface for a particular program/application). For example, in FIG. 2, Server A,1 includes CNI 32 and Server A,2 includes CNI 33. Each server may In some embodiments, the ToR router 22A further includes an extensible network control plane 40 extendable to the plurality of nodes (e.g., Servers A,1 and A,2 in FIG. 2), and further wherein upon receipt of packet data at the ToR router 22A, the ToR router 22A can write an index location on a forwarding table that includes, for example, an endpoint address readable by the extensible network control plane 40 within the plurality of nodes (e.g., Server A,1 and Server A,2), such that the packet data can be routed directly to a desired endpoint location.

HTTP Example:

One nonlimiting example of operation could involve an incoming packet from the external network 25 with an HTTP header having multiple possible endpoints within a network environment. Upon receipt at the ToR (e.g., 22A in FIG. 2), hardware within the ToR 22A may install an entry at an index location of a forwarding table. The index location could include an encoding of the endpoint address as a Sunder Cluster Index (sunCI). The sunCI can be generated by control plane processing of the create, update, delete (CRUD) of service endpoints or service back ends, and act to uniquely identify network endpoints at a clustering level. The entry may map an HTTP ingress specification to a virtual machine or container (pod) IP address associated with a service object. The forwarding table can then indicate a destination pod IP address and fabric-wide unique identifier when processing the packet. On the return path, the table can provide a source virtual IP address for mapping the return.

The systems and methods described herein, including the non-limiting examples, may be applied to any type of network communication protocol. Other exemplary protocols/packet headerss may include HTTPS, HTTP/2, Json Web Tokens (JWT), VxLAN, MPLS, vlan, and IPv6. The packet could also be received with a Segment Routing header, a Real-time Streaming Protocol, a Real-time Transport Protocol, a Network File System, a Remote Procedure Protocol, a remote direct memory access (RDMA), a Session Initiation Protocol, and others, for example.

Sample ingress flow, egress flow and flow termination in accordance with aspects of the present disclosure are now described. Reference is also made to FIGS. 4 through 7.

Control Plane:

During normal operation, the control plane may attempt to reconcile the state presented by the ingress, service, and endpoint state representation server. In some embodiments, the control plane may be running on one or more of the various servers (e.g., server A,1), and may be interacting with the various data plane elements to reconcile the "state." The control plane may be, for example, a network operating system rather than a particular process. The control plane may survey any or all accessible network elements across the various domains to reconcile a state. One non-inclusive example of such a server is the Kubernetes API server, exemplary embodiments of which are discussed in greater detail herein.

Endpoints:

In one example, a pod may be instantiated by a request from a kubernetes API and be scheduled to a node. The node may create a "pod sandbox" and execute a CNI binary that passes in a configuration specification.

The CNI may then connect and configure the pod's interfaces, and the subsequent returning results may be stored within the Kubernetes API server.

Such activity may result in an update to the pod specification, which may consequently be processed by a controller to update addressing buckets for the selection on a new flow in a dataplane.

In some embodiments, each time a change to the backend endpoints occurs, a revision indexed bucket can be triggered. This revision history can be maintained in the controller memory as well as instantiated in hardware tables, for example. It will be appreciated that a purpose for this overhead can be easement of transition and is not necessarily critical to the forwarding path outside of session state congruence.

Services:

In some embodiments, a service may be instantiated by a request from the Kubernetes API server. Such request may cause a Kubernetes label selection routine to run against pod selector labels which may yield a cascading update stream into endpoint revision increments, thus triggering an endpoint control loop to execute.

In some embodiments, a 'service ip create' update can cause a 13svcIP table control update. An update not affecting service ip typically causes no data plane updates to 13svcIP table.

Ingresses:

In some embodiments, an HTTP Ingress can be instantiated by a request from the Kubernetes API server. Such request may cause the Kubernetes label selection routine to run against svc selector labels as viable backends and completes the next table lookup values for ingress steering, for example.

In some embodiments, control plane processing of a resulting cascading updates is left to the respective processor. Endpoints, for example, can be processed by the endpoint control loop even though ingress change could be the culpable party.

In some embodiments, ingress specification updates may be reflected in the combined updates to the domain key and path to reflect a well-formed URN. An URN can be used to distinctly address a resource, both before and after deployments.

Ingress Flow:

In one example, an HTTP2 SYN packet can be generated by the source client machine with a destination of a virtual service IP address that resides on the ToR.

In some embodiments of this example, upon receiving this packet, the ToR can decapsulate the packet and determine that the given packet is of type HTTP2, for example, and has a source TCP port that falls within the ephemeral port range, a destination port of 80, has the SYN flag set, and does not have a matching flow entry in memory.

Register indexing may then be calculated using, for example, the ether type, layer 4 source port, layer 4 destination port. This index can be used in accessing/setting register values in an effort to support multiple clients and flows, for example.

The ToR may then map the intended target service via http2 headers resulting in destination service ip address with the optimal Kubernetes pod and associated Sun_IDX, which can subsequently yield the pod's IP address and node location for egress port specification.

The ToR may also add an entry into memory for this flow using the register index as the key and store the Sun_IDX destination UUID for consistent delivery throughout the client session.

The packet may be forwarded toward the destination server/pod with the original client IP address and TCP port intact, the original destination IP address may be replaced with the Kubernetes pod IP address, and the source and destination mac address may be replaced with the Sun_IDX header.

In some exemplary embodiments, once the packet is received by the CNI vSwitch on the destination server, the vSwitch can create in-memory registers for a hash of the ingress port, the client IP address, source and destination TCP port.

In some embodiments, the Sun_IDX can be inspected by the vSwitch and replaced with an arbitrary mac address associated with the vSwitch as the source and the destination mac address assigned to the destination pod. The destination mac address of the pod may be known by the CNI which may then communicate this information to the vSwitch at, for example, the time of pod creation. This packet can then be forwarded from the vSwitch to the destination pod/vm.

In some embodiments, the CNI has previously setup the veth interface and added it to the container namespace. The IP default gateway and DNS server for the pod sandbox may also be part of this process in addition to a static address resolution protocol (arp) for the gateway address.

It will be appreciated by those having skill in the art that ingress and egress, as used throughout this specification, do not necessarily implicate any one direction of flow, and that such flows and directions of travel may be in any direction relative to the servers, etc. discussed herein.

Egress Flow:

In some embodiments, for the return trip/response to the above ingress flow, the pod may begin a logical process of determining a route to the original client IP address. Because this communication was sourced from outside of the Kubernetes cluster, no routing entry will be present in the pod's routing table. At the time of pod creation, a static entry for the default gateway may have been added to the pod's arp table. In this exemplary scenario, the default route, pointing toward the upstream connected vSwitch, may be used.

The pod may create a standard HTTP2 ethernet packet with the source IP address of the pod, source mac address of the pod, source TCP port of 80, destination IP address of the original client, destination mac address of the vSwitch, destination TCP port of the ephemeral port originally selected by the client. This port may then sent from the pod to the vSwitch.

The vSwitch can then receive the packet, and in some embodiments may zero the mac addresses for internal signaling, add the appropriate SUN_IDX header, and forward the packet toward the ToR using for example the last seen ingress port.

In some embodiments, using the last used ingress port can maintain symmetric routing in multi-ToR deployment. On ingress from the ToR, the ingress port, client IP, source and destination TCP port can be written to memory as a unique hash. On the egress, the destination (client) IP, destination and source TCP ports can be used to rebuild the flow hash and determine which port the packet should egress to maintain proper TCP state.

Upon receiving the packet, the ToR may begin an inspection process. During this inspection, the ToR may identify that the source TCP port is 80, a known externally exposed service port. The ToR may further identify that a TCP ACK flag is set. The ToR may also identify the Sun_IDX header and query the flow tracking mechanism in memory. This query can return results containing the original client IP address, virtual IP address of the externally exposed service, and that the last packet seen for this flow did not have the TCP FIN and ACK flag set.

In some embodiments, the ToR may send a packet outbound toward the client with the source IP address of the virtual service IP address, TCP source port of 80, source mac address of the ToR network interface, destination IP address of the client, destination TCP port of the ephemeral port originally selected by the client, and destination mac address of the remote next hop, for example.

Flow Termination:

In some embodiments, if a TCP FIN is detected from the client the resulting fin-ack, ack can be fast tracked to free the server sockets, ToR may respond to FIN with fin-ack and vSwitch may forward the initial client FIN, and reply to the fin-ack with a vSwitch generated ack leading to more efficient connection termination.

It will thus be appreciated that embodiments of the present disclosure provide a disaggregated, virtual infrastructure management (VIM), network controller that significantly reduces ingress and intra-cluster latency and optimizes resource consumption in VI environments.

Embodiments of the present disclosure solve the existing problem of inefficient network pathing and latency overhead into and within virtual infrastructure (VI) clusters. This includes solving, for example, the Linux kernel bottleneck problems that emerge from independent, suboptimal compute scheduling for both the virtual control plane and physical network forwarding control plane.

Additionally, embodiments of the present disclosure can help solve existing issues and inefficiencies of operationalizing VI clusters, with emphasis on the network forwarding and policy challenges of integrating the cluster with an existing physical network. Such solutions can be realized according to the present disclosure by re-architecting, for example, the network control fabric for virtual infrastructures, which can result in significantly reduced latency incurred from software processing of packet headers by instead running the processes, for example, on a customized hardware ASIC (for example) replacing kernel-based packet processing with a customized hardware network interface card, which can reduce CPU load incurred from existing Linux packet processing interrupt-based means, arbitrary header matching and resulting actions yielding fully controllable steering of packets throughout the cluster.

Embodiments of the present disclosure differ from other approaches by redesigning the way in which network traffic is forwarded to and routed within a VI cluster. By leveraging a programmable, top of rack (ToR), layer 3 switch, embodiments as disclosed herein can remove the legacy VI ingress controllers and extend the network fabric directly to the individual VI nodes and pods. In this way, the existing approach of software-based network ingress controllers can be fully replaced with more advantageous hardware solutions.

The resulting advantages of a disaggregated, programmable VI network controller according to the present disclosure are significantly reduced latency, reduction of resource overhead within the cluster, increased IP address utilization efficiency, as well as simplified cluster management and maintenance.

One advantage associated with the present disclosure is significant reduction in latency. For example, as disclosed herein, a programmable ToR switch-based network controller can include an ingress controller directly on the hardware switch. In doing so, the presently disclosed embodiments can take advantage of significant efficiencies gained in hardware processing as compared to legacy software-based network processes. This latency reduction can become even more pronounced as the inefficiencies of the legacy software-based network functions are compounded by the processes stacking in the kernel as cluster and resource utilization increases.

Further, the presently disclosed systems and methods can allow for bypassing the infra controller. By extending the network fabric from the top of rack directly into the cluster, embodiments of the present disclosure can skip all hops from infra node to worker nodes, thereby further reducing latency.

The systems and methods disclosed herein also provide simplified VI network management and maintenance. For example, by extending the network fabric directly into the cluster, the address pool requirements can be simplified and the total quantity of distinct subnets and IPs required can be reduced. There can also be additional capability to associate floating/virtual IP addresses to internal services, while still supporting domain name-based ingress functionality. This capability can be provided according to the present disclosure without the need for separate software containers (i.e. it can instead be achieved in hardware at the ToR).

Maintenance of VI nodes can also be simplified by allowing the compute and network layers to be aware of one another. VI node draining, for example, is the graceful termination of all pods on a node to achieve a desired "maintenance mode". According to the present disclosure, cordoned nodes, or nodes marked as unschedulable, can also be drained at the network layer. Existing tooling only drains the compute layer, for example, as the network and compute layer are not aware of each other.

Thus, it will be appreciated that in some embodiments, a disaggregated, programmable VI network controller according to the present disclosure can be implemented in a physical, layer 3 ToR switch and deployed in conjunction with a VI environment. This architecture can replace the current software-defined network ingress controller and intra-node forwarding services that reside within a VI cluster. Embodiments of the present disclosure can be used as the physical network infrastructure and network controller, for use including, but not limited to, the network traffic ingress and intra-node forwarding controller for VI clusters. Embodiments of the present disclosure can also be used to optimize the network traffic ingress and intra-node forwarding of any virtual environment, including virtual machine clusters, Kubernetes clusters, rancher clusters, docker-swarm clusters, etc.

It will be appreciated that, when embodied as a system, the present embodiments can incorporate necessary processing power and memory for storing data and programming that can be employed by the processor(s) to carry out the functions and communications necessary to facilitate the processes and functionalities described herein. Unless otherwise stated, devices or components of the presently disclosed embodiments that are in communication with each other do not need to be in continuous communication with each other. For example, the present disclosure can be embodied as a device incorporating a hardware and software combination implemented so as to process computer network traffic in the form of packets en route from a source computing device to a target computing device. Such device need not be in continuous communication with computing devices on the network. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, a processor (e.g., a microprocessor or controller device) receives instructions from a memory or like storage device that contains and/or stores the instructions, and the processor executes those instructions, thereby performing a process defined by those instructions. Further, programs that implement such methods and algorithms can be stored and transmitted using a variety of known media.

Common forms of computer-readable media that may be used in the performance of the presently disclosed embodiments include, but are not limited to, floppy disks, flexible disks, hard disks, magnetic tape, any other magnetic medium, CD-ROMs, DVDs, any other optical medium, punch cards, paper tape, any other physical medium with patterns of holes, RAM, PROM, EPROM, FLASH-EEPROM, any other memory chip or cartridge, or any other medium from which a computer can read. The term "computer-readable medium" when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, optical or magnetic disks and other persistent memory. Volatile media can include dynamic random-access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP), Wi-Fi, Bluetooth, GSM, CDMA, EDGE and EVDO.

Where databases are described in the present disclosure, it will be appreciated that alternative database structures to those described, as well as other memory structures besides databases may be readily employed. The accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon. In certain embodiments, the system can employ any suitable computing device (such as a server) that includes at least one processor and at least one memory device or data storage device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a single device or on multiple devices.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the above described embodiments are merely illustrative of numerous and varied other embodiments which may constitute applications of the principles of the presently disclosed embodiments. Such other embodiments may be readily implemented by those skilled in the art without departing from the spirit of scope of this disclosure.

The invention claimed is:

1. A system for managing communications in a virtual infrastructure environment, the system comprising:
    a top of rack router comprising a processor, the top of rack router configured to receive a first data packet from outside the virtual infrastructure environment;
    a plurality of nodes within the virtual infrastructure environment, each of the nodes comprising a network interface controller and a socket; and
    an extensible network control plane extendable from the top of rack router to the plurality of nodes,
    wherein upon receipt of the first packet, the top of rack router writes an index location comprising an endpoint address readable by the extensible network control plane within the plurality of nodes on a forwarding table, and the first data packet is routed directly to the endpoint address.

2. The system of claim 1, wherein the top of rack router identifies one or more subsequent data packets of a flow having one or more flow specific characteristics associated with the first data packet, and writes the index location to the one or more subsequent packets without utilizing the forwarding table, and forwards the one or more subsequent packets to the endpoint address.

3. The system of claim 2, wherein the one or more flow specific characteristics include a hash value common to a header included in the data packets of the flow.

4. The system of claim 2, wherein a hash value of a header of the first data packet is logged in a register, and the registered hash values are used to identify the one or more subsequent data packets of the flow.

5. The system of claim 2, wherein the first data packet is returned to a location outside the virtual infrastructure environment via the top of rack router, and further wherein the top of rack router uses the forwarding table to identify the first data packet and replace the index location with original source information, and the first data packet is forwarded out of the virtual infrastructure environment.

6. The system of claim 5, wherein the one or more subsequent data packets are returned to a location outside the virtual infrastructure environment, and further wherein the top of rack router identifies the one or more subsequent data packets having one or more flow specific characteristics associated with the first data packet, and applies the original source information of the first data packet to the one or more subsequent packets without utilizing the forwarding table.

7. The system of claim 1, wherein the step of writing the index location to the forwarding table is performed using a hardware processor.

8. The system of claim 7, wherein the hardware processor comprises at least one of an application-specific integrated circuit (ASIC), field-programmable gate array (FPGA), and an application-specific instruction set processor (ASIP).

9. A method of managing communications in a virtual infrastructure environment comprising a plurality of nodes, comprising the steps of:
    a. receiving, at a top of rack router, a first data packet from outside the virtual infrastructure environment having multiple possible endpoints within a network environment,
    b. writing, at the top of rack router, an index location for the first data packet on a forwarding table, wherein the index location comprises an endpoint address readable by an extensible network control plane that extends to a plurality of nodes within the virtual infrastructure environment;
    c. replacing, at the top of rack router, original source information in the first data packet with new destination information that includes the endpoint address readable by the extensible network control plane; and
    d. forwarding the first data packet to a desired endpoint location within a particular node of the virtual infrastructure environment corresponding to the endpoint address.

10. The method of claim 9, wherein the top of rack router identifies one or more subsequent data packets of a flow having one or more flow specific characteristics associated with the first data packet, and applies the new destination information to the one or more subsequent packets without utilizing the forwarding table.

11. The method of claim 10, wherein the one or more flow specific characteristics include a hash value common to a header included in the data packets of the flow.

12. The method of claim 10, wherein a hash value of a header of the first data packet is logged in a register, and the registered hash values are used to identify the one or more subsequent data packets of the flow.

13. The method of claim 10, further comprising the step of returning the first data packet to a location outside the virtual infrastructure environment, wherein upon receipt of the first data packet back at the top of rack router, the top of rack router uses the forwarding table to identify and replace the new destination information with the original source information, and the first data packet is forwarded out of the virtual network.

14. The method of claim 13, further comprising the step of returning the one or more subsequent data packets to a location outside the virtual infrastructure environment, wherein the top of rack router identifies the one or more subsequent data packets having one or more flow specific characteristics associated with the first data packet, and applies the original source information of the first data packet to the one or more subsequent packets without utilizing the forwarding table.

15. The method of claim 9, wherein the forwarding table is maintained in a local network element.

16. The method of claim 9, wherein the step of writing the index location to the forwarding table is performed using a hardware processor.

17. The method of claim 16, wherein the hardware processor comprises at least one of an application-specific integrated circuit (ASIC) chip, a field-programmable gate array (FPGA), or an application-specific instruction set processor (ASIP).

18. The method of claim 9, wherein the step of writing the index location to the forwarding table is performed in a control plane.

19. The method of claim 18, wherein the control plane includes a CPU for executing software instructions.

20. The method of claim 9, wherein the communications are based in an HTTP protocol.

* * * * *